United States Patent [19]
Eckert et al.

[11] Patent Number: 4,811,517
[45] Date of Patent: Mar. 14, 1989

[54] VEHICLE DOOR OR BODY SECTION, ESPECIALLY FOR A PASSENGER MOTOR VEHICLE

[75] Inventors: Dieter Eckert, Magstadt; Wolfgang Henseler, Tübingen; Hans Luetze, Sindelfingen, all of Fed. Rep. of Germany

[73] Assignee: Daimler-Benz Aktiengesellschaft, Fed. Rep. of Germany

[21] Appl. No.: 111,054

[22] Filed: Oct. 22, 1987

[30] Foreign Application Priority Data

Oct. 22, 1986 [DE] Fed. Rep. of Germany ....... 3635924

[51] Int. Cl.⁴ .............................................. E06B 3/32
[52] U.S. Cl. ......................................... 49/145; 49/103; 49/385; 49/502
[58] Field of Search .................. 49/502, 385, 227, 145, 49/103

[56] References Cited

U.S. PATENT DOCUMENTS

| | | | |
|---|---|---|---|
| 2,122,963 | 7/1938 | Susor | 49/103 |
| 2,253,805 | 8/1941 | Olivier | 49/145 |
| 2,809,827 | 10/1957 | Bogden | 49/227 X |
| 2,863,658 | 12/1958 | Moyes | 49/227 X |
| 3,273,285 | 9/1966 | Champion | 49/385 X |
| 4,503,639 | 3/1985 | Rossie et al. | 49/227 X |

Primary Examiner—Philip C. Kannan
Attorney, Agent, or Firm—Barnes & Thornburg

[57] ABSTRACT

A vehicle door or body section, especially for a passenger motor vehicle with a door body or body section made essentially of an outer and of an inner body panel and with a window arranged above the same which essentially consists of an approximately rectangularly shaped vertically displaceable side window and an adjoining approximately triangularly shaped window part, whereby for purposes of opening the window the side window and the window part can be lowered completely into the door body or body section in that the window part is pivotal within the area of its corner opposite the side window about an axis arranged approximately perpendicularly to its window plane; the side window and window part extend thereby in a common plane and the side window is provided within the area of its upper corner facing the window part with an inclination in such a manner that in the lowered condition of the side window and of the window part, the front edge of the window part extends adjacent the inclination at a distance with respect thereto.

16 Claims, 3 Drawing Sheets

VEHICLE DOOR OR BODY SECTION, ESPECIALLY FOR A PASSENGER MOTOR VEHICLE

BACKGROUND AND SUMMARY OF THE INVENTION

The present invention relates to a vehicle door or a body section, especially for a passenger motor vehicle, with a door body or body part essentially made of an outer and inner sheet metal panel and with a window arranged above the same and consisting of an approximately rectangularly shaped vertically displaceable (side) window and of an adjoining approximately triangularly shaped window part, whereby for purposes of opening the window, the side window and the window part are completely lowerable into the door body or into the body part in that the window part is pivotal about an axis arranged approximately perpendicularly to its window plane within the area of a corner opposite the side window.

Such a type of vehicle door is disclosed in the French Patent No. 93,917. It is disadvantageous with this prior art arrangement that the two window panes extend in different planes which are located one behind the other, as viewed in vehicle transverse direction. On the one hand, this disturbs the optical overall impression of the vehicle and, on the other, wind noises cannot be avoided at the thus-formed offset.

The present invention is therefore concerned with the task to avoid these disadvantages of the known arrangement and to provide a completely lowerable window arrangement which fits in an optically completely satisfactory manner into the overall appearance of the vehicle and which does not give rise to the generation of disturbing wind noises.

The underlying problems are solved in accordance with the present invention in a vehicle door or a body section of the aforementioned type in that the side window and a window part extend in a common plane and in that the side window is provided within the area of its upper corner facing the window part with an inclination in such a manner that in the lowered condition of the side window and of the window part, the front edge of the window part extends adjacent the inclination at a distance with respect thereto.

In a further development of the vehicle door according to the present invention, the side window in the lowered condition extends with its edge facing the window part up to the door inner flanks delimiting the door body. The cooperation of the side window and of the window part are further optimized by this measure in the lowered condition thereof, especially as regards any wheel opening or cut-out that may exist.

BRIEF DESCRIPTION OF THE DRAWINGS

These and other objects, features and advantages of the present invention will become more apparent from the following description when taken in connection with the accompanying drawing which shows, for purposes of illustration only, one embodiment in accordance with the present invention, and wherein.

DETAILED DESCRIPTION OF THE DRAWINGS

Figure 1:
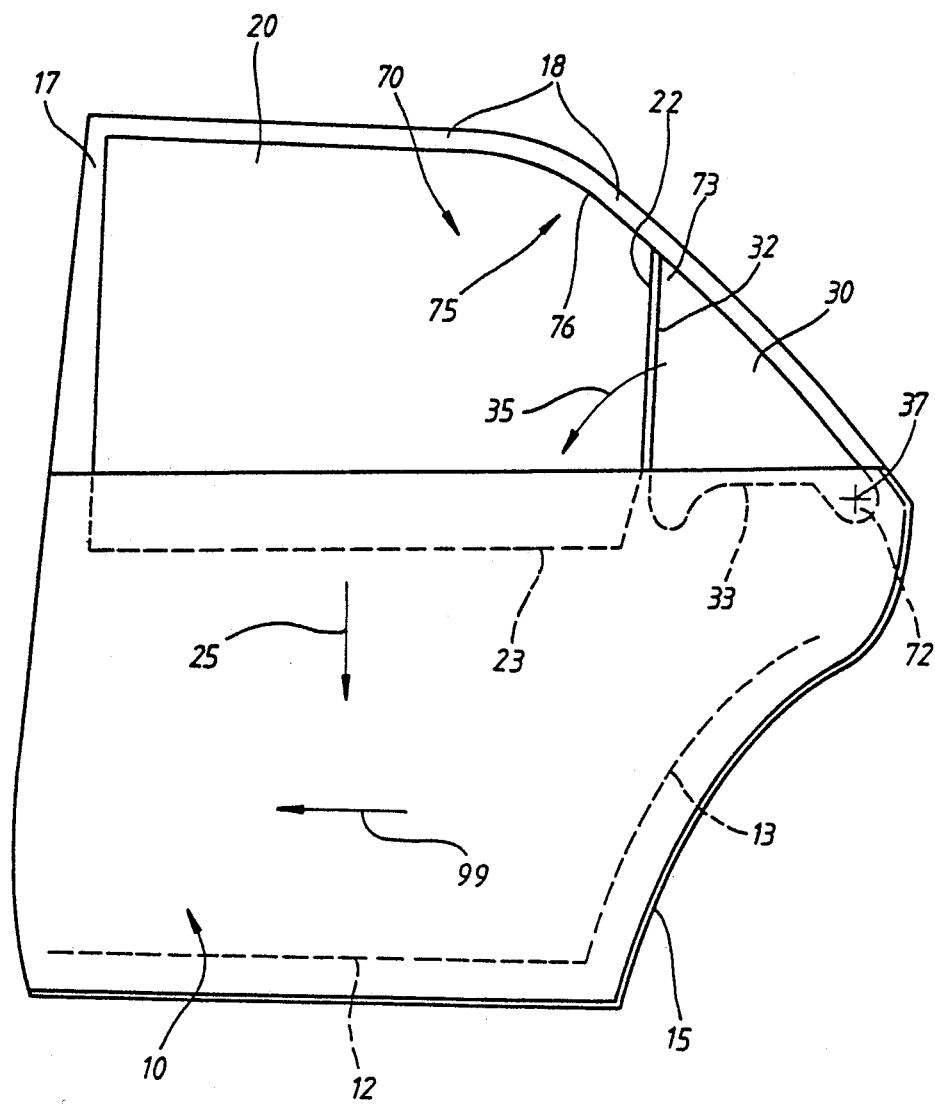
FIG. 1 is a schematic side elevational view of a rear door of a passenger motor vehicle in accordance with the present invention provided with a wheel opening, as viewed from the outside of the vehicle and with a closed window.

Referring now to the drawing wherein like reference numerals are used throughout the various views to designate like parts, the left rear door of a passenger motor vehicle illustrated in FIGS. 1 to 4, essentially consists of a door body generally designated by reference numeral 10 which is provided with a wheel opening or cutout 15, with a window frame 17, 18 and with a window generally designated by reference numeral 70 consisting of a side window 20 and of a window part 30. The door body 10 is essentially made, in a known manner not illustrated in detail, of an outer sheet metal panel and of an inner sheet metal panel, and possesses an approximately rectangular shape, whereby the wheel opening or cutout 15 is located in FIGS. 1 to 4 within the area of the right lower corner of the door body 10. The door body 10 is at least partially hollow on the inside so that the side window 20 and the window part 30 can be completely lowered into the door body 10. The window frame 17, 18 is arranged above the door body 10 and consists of a part 17 protruding approximately vertically from the door body 10 and of a part 18 which extends at first approximately horizontally and then obliquely downwardly toward the door body 10. The driving direction of a vehicle provided with the described rear door is indicated by an arrow 99.

The side window 20 has an approximately rectangular configuration. It can be seen in particular from FIGS. 1 and 2 that the upper right corner of the side window 20 which is designated by reference numeral 75, is provided with an inclined portion 76. The rear edge of the side window 20 facing the window part 30 is designated by the reference numeral 22 and the lower edge by the reference numeral 23. The window part 30 is constructed of approximately triangular shape and adjoins in FIGS. 1 to 4 the side window 20 on the right side thereof. It can be seen in particular from FIG. 1 that the front edge of the window part 30 facing the side window 20 and designated by reference numeral 32 extends parallel to the rear edge 22 of the side window 20 and possesses approximately the same length as the side window 20. The upper corner of the window part 30 which forms an acute angle and faces the side window 20, is designated by reference numeral 73, the lower corner, which also forms an acute angle and is opposite the side window 20, is designated by reference numeral 72 and the lower edge of the window part 30 is designated by reference numeral 33. Furthermore, it can be readily seen in particular from FIGS. 1 and 2 that the window part 30 is provided within the area of its corner 72 with an axis 37 that is arranged approximately perpendicularly to the plane of its window pane. If the window plane of the side window 20 and of the window part 30 is aligned approximately vertically, then the axis 37 extends approximately horizontally.

The window 70 consisting of the side window 20 and the window part 30 is illustrated in FIG. 1 in its closed condition. The side window 20 and the window part 30 completely fill out the area of the window 70 and extend partly into the interior space of the door body 10. For opening the window 70, a drive or actuating device of any known type is provided in a manner not illustrated in detail which lowers the side window 20 in the vertical direction corresponding to the arrow 25, and which pivots the window part 30 about the axis 37 in the direction toward the side window 20 corresponding to the arrow 35. This drive or actuating mechanism is so constructed by conventional means that it first lowers the side window 20 and thereupon, possibly as soon as this is feasible, or only with a completely lowered side window 20, pivots the window part 30.

Figure 2:
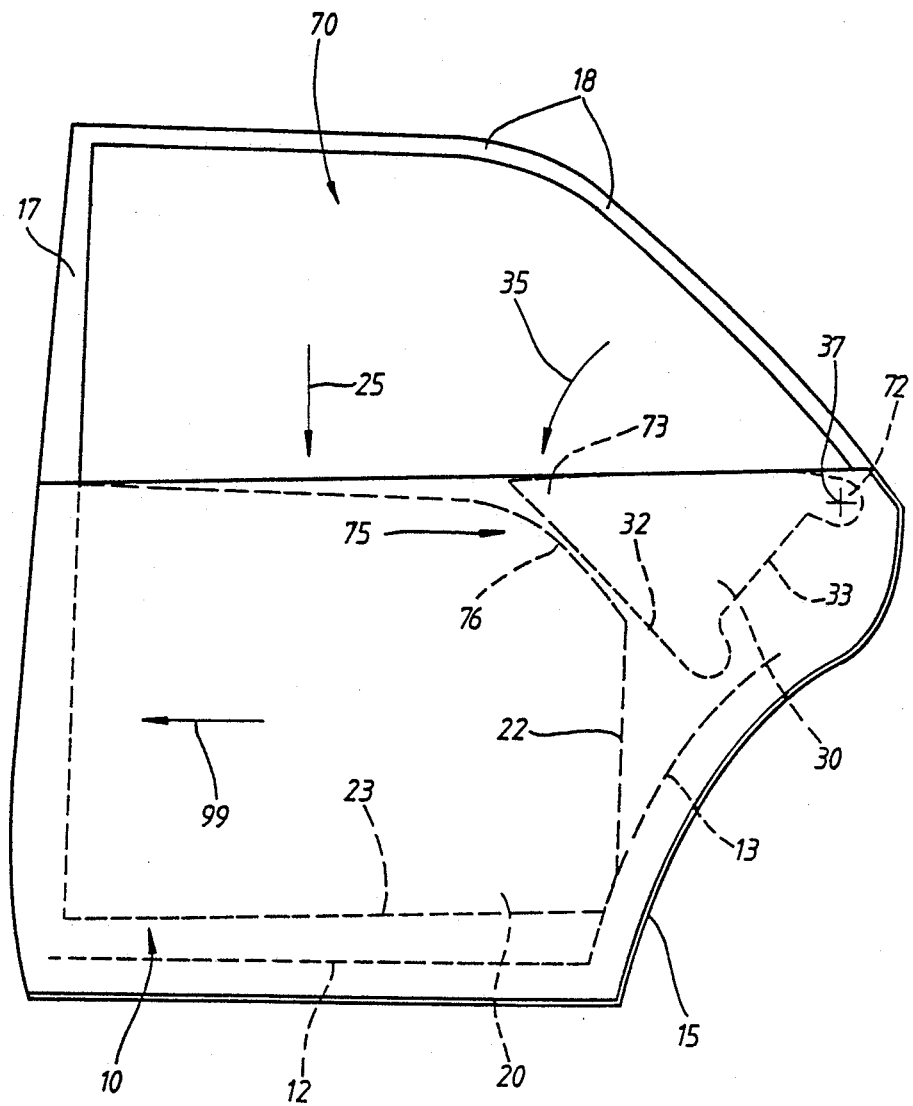
FIG. 2 is a side elevational view of the rear door of FIG. 1 with an opened window.

The opened condition of the window 70 is shown in FIG. 2. The side window 20 and the window part 30 are completely lowered into the door body 10 in this condition. In this opened condition of the window 70, the area of the corner 73 of the window part 30 is arranged approximately within the area of the bevelled corner 75 of the side window 20. The corner 73 of the window part 30 therefore fills out the area which is not needed by the side window 20 owing to the inclination 76. In the lowered condition according to FIG. 2, the side window 20 extends with its lower edge 23 nearly up to a door inner flank 12 which delimits the interior space of the door body 10. The side window 20 butts with its rear edge 22 at a door inner flank 13 which is produced by the wheel opening 15. The lower edge 33 of the window part 30 extends in its lowered condition according to FIG. 2 nearly up to the mentioned door inner flank 13.

For purposes of closing the window 70, the drive or actuating mechanism (not shown) actuates the side window 20 and the window part 30 in a reverse manner. The drive or actuating mechanism therefore at first pivots the window part 30 upwardly and then also displaces the side window 20 upwardly until the window part 30 and the side window 20 reach the window frame 17, 18.

In FIGS. 1 and 2, the side window 20 and the window part 30 are illustrated without any mounting and guide means. However, it is understood that the side window 20 and the window part 30 are provided with frames, with the aid of which is formed, for example, the pivot axis 37 of the window part 30. The vertical guidance of the side window 20 can be constructed in a known manner and is therefore not explained herein in detail.

Figure 3:
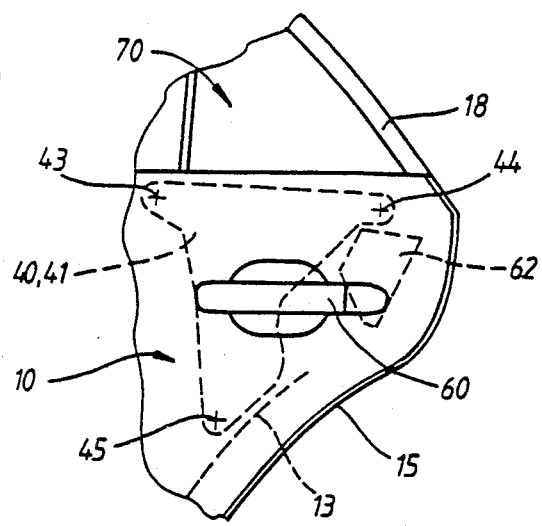
FIG. 3 is a partial side elevational view of the rear door of FIGS. 1 and 2 in which certain components are shown which are not illustrated in FIGS. 1 and 2.

A guidance for the window part 30 is illustrated in FIG. 3. This guidance essentially consists of a guide plate 40 which is arranged in the interior space of the door body 10 approximately parallel to the window part 30. For adjusting the position of the guide plate 40 and especially the alignment thereof with respect to the window part 30, adjusting devices 43, 44 and 45, especially adjusting screws, are provided at the guide plate 40.

The guide plate 40 and the door outer part form a gap-shaped intermediate space into which the window part 30 immerses, especially during the lowering into the door body 10. For purposes of a noiseless and scratch-free pivoting of the window part 30, slide devices 50 and 51, for example, small plastic material parts or the like are attached on both sides of the window pane within the area of the lower corner of the window part 30 facing the side window 20. These slide devices move along a slide track 50 during the pivoting of the window part 30 and abut during this movement at the facing surface of the guide plate 40.

As explained hereinabove, the left rear door of a passenger motor vehicle is illustrated in FIGS. 1 to 4. As can be seen from FIGS. 3 and 4, the rear door is provided above the wheel opening 15 with a door handle 60 and a door lock 62 for opening and locking the door. The locations of the guide plate 40, of the door handle 60, of the door lock 62 and of the lower edge 33 of the window part 30, are so matched to one another in the lowered condition of the window part 30 according to FIG. 4 that sufficient space exists in the interior of the door body 10 for the installation especially of the door lock 62.

Figure 4:
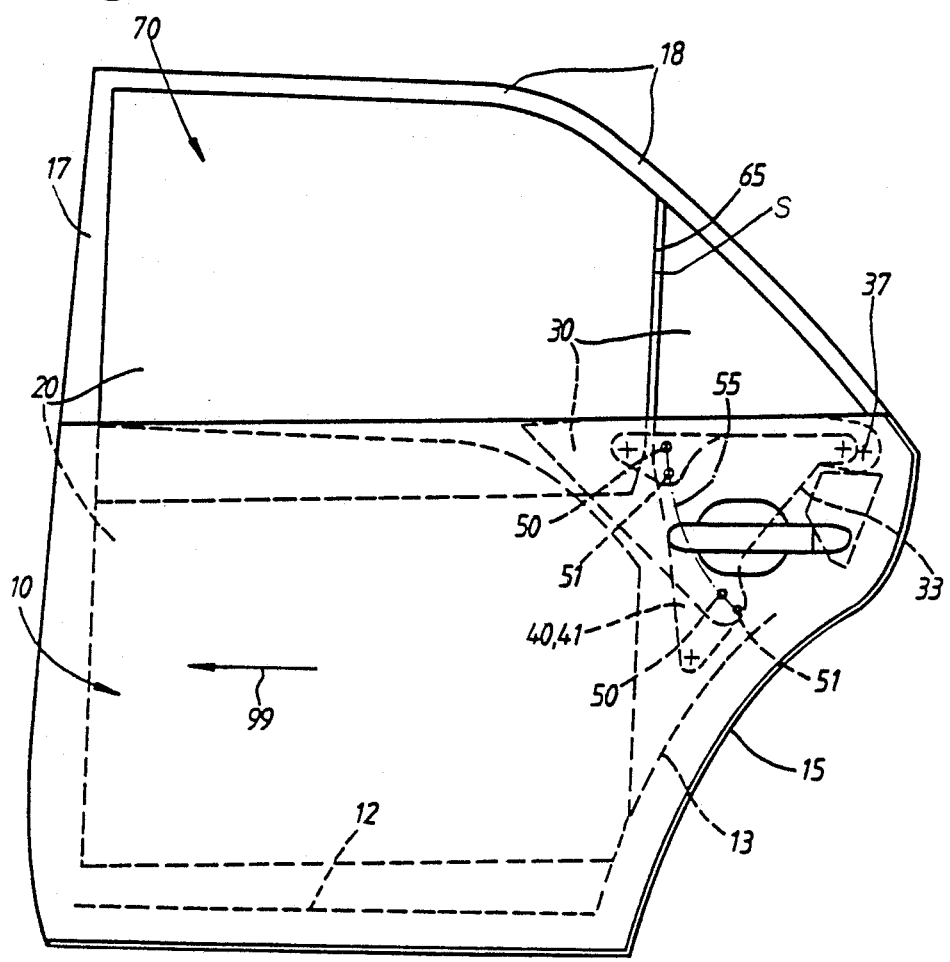
FIG. 4 is a side view of the rear door of FIGS. 1 to 3, whereby the closed condition of the window of FIG. 1, the opened condition of the window of FIG. 2 and the certain components illustrated in FIG. 3 are superimposed on one another.

As also already explained, the rear edge 22 of the side window 20 and the front edge 32 of the window part 30 extend parallel to one another. A gap 65 results between the side window 20 and the window part 30 in this place as can be seen in FIG. 4. This gap 65 can be filled out in a known manner with a sealing strip S which can be attached either at the side window 20 or at the window part 30.

It is also understood that the described arrangement and movement of the side window 20 and of the window part 30 can also be used with front doors of a passenger motor vehicle. It is also possible to dispense with the window frame 17, 18 provided in the described vehicle door. Similarly, the possibility also exists to provide the pivoting of the window part 30 also in vehicle doors which are not provided with any wheel opening or are provided only with a slight wheel opening.

Another application possibility of the present invention exists if such a window lowering is to take place in a fixed body section with or without wheel opening; this applies, for example, to the rear windows of a coupe.

While we have shown and described only one embodiment in accordance with the present invention, it is understood that the same is not limited thereto, but is susceptible of numerous changes and modifications as known to those skilled in the art, and we therefore do not wish to be limited to the details shown and described herein but intend to cover all such changes and modifications as are encompassed by the scope of the appended claims.

We claim:

1. A body section especially for a passenger motor vehicle, comprising body means essentially made of an inner and outer body panel, and window means arranged above said body means including an approximately rectangularly shaped, vertically displaceable window and an adjoining, approximately triangularly shaped window part, the window and window part being operable to be substantially completely lowered into the body means for purposes of opening the window means, the window part being pivotal about an axis arranged at least approximately perpendicularly to the plane of its window pane within the area of a corner facing the window, the window and the window part extending in a common plane and the window being provided within the area of its upper corner facing the window part with an inclined portion in such a manner that in the lowered condition of the window and of the window part, the front edge of the window part extends adjacent the inclined portion and at a distance from the latter.

2. An arrangement according to claim 1, wherein at least one of the window and window part is provided at least partly with frame means serving for the mounting thereof.

3. An arrangement according to claim 1, wherein at least one of window and window part is provided with slide means.

4. An arrangement according to claim 1, wherein a gap is formed between the window and the window part which is filled out by a sealing bar that is attached at one of window and window part.

5. An arrangement according to claim 1, wherein the window means is surrounded by a window frame means.

6. An arrangement according to claim 1, wherein the body means is a vehicle door, the window of the window means is a side window which is adjoined by the window portion in the longitudinal direction of the vehicle.

7. An arrangement according to claim 6, wherein the window in its lowered condition extends with its edge facing the window part up to inner flanks delimiting the body means.

8. An arrangement according to claim 6, wherein a gap is formed between the window and the window part which is filled out by a sealing bar that is attached at one of window and window part.

9. An arrangement according to claim 8, wherein the window means is surrounded by a window frame means.

10. An arrangement according to claim 1, wherein the window in its lowered condition extends with its edge facing the window part up to inner flanks delimiting the body means.

11. An arrangement according to claim 10, wherein the inner flanks are door inner flanks delimiting a vehicle door.

12. An arrangement according to claim 1, wherein a guide plate means is provided inside of the body means which serves for the guidance of at least one of the window and the window part.

13. An arrangement according to claim 12, wherein the guide plate means is adjustable.

14. An arrangement according to claim 12, wherein at least one of the window and window part is provided at least partly with frame means serving for the mounting thereof.

15. An arrangement according to claim 14, wherein at least one of window and window part is provided with slide means.

16. An arrangement according to claim 15, wherein at least one of guide plate means, frame means and slide means is adjustable.

* * * * *